US009742710B2

(12) United States Patent
Wu et al.

(10) Patent No.: US 9,742,710 B2
(45) Date of Patent: Aug. 22, 2017

(54) MOOD INFORMATION PROCESSING METHOD AND APPARATUS

(71) Applicant: Huawei Technologies Co., Ltd., Shenzhen (CN)

(72) Inventors: Hao Wu, Shenzhen (CN); Kangmin Huang, Shenzhen (CN); He Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/276,416

(22) Filed: Sep. 26, 2016

(65) Prior Publication Data

US 2017/0012911 A1 Jan. 12, 2017

Related U.S. Application Data

(63) Continuation of application No. PCT/CN2014/094120, filed on Dec. 17, 2014.

(30) Foreign Application Priority Data

Mar. 27, 2014 (CN) .......................... 2014 1 0119539

(51) Int. Cl.
| | | |
|---|---|---|
| H04L 12/58 | (2006.01) | |
| H04L 29/08 | (2006.01) | |
| H04M 1/725 | (2006.01) | |
| H04M 3/42 | (2006.01) | |

(52) U.S. Cl.
CPC .............. *H04L 51/08* (2013.01); *H04L 51/10* (2013.01); *H04L 51/32* (2013.01); *H04L 67/22* (2013.01); *H04M 1/72569* (2013.01); *H04M 3/42374* (2013.01); *H04M 1/7255* (2013.01); *H04M 2250/74* (2013.01)

(58) Field of Classification Search
CPC ......... H04L 51/08; H04L 51/10; H04L 67/22; H04M 1/7255

See application file for complete search history.

(56) References Cited

U.S. PATENT DOCUMENTS

| | | | |
|---|---|---|---|
| 7,627,475 B2 | 12/2009 | Petrushin | |
| 8,543,834 B1 | 9/2013 | Barra | |
| 2006/0242424 A1 * | 10/2006 | Kitchens ................. | G06F 21/32 713/183 |
| 2008/0294741 A1 * | 11/2008 | Dos Santos .......... | G06Q 10/107 709/206 |

(Continued)

FOREIGN PATENT DOCUMENTS

| | | |
|---|---|---|
| CN | 101751923 A | 6/2010 |
| CN | 102780651 A | 11/2012 |

(Continued)

*Primary Examiner* — Kashif Siddiqui

(57) ABSTRACT

Embodiments of the present invention disclose a mood information processing method and apparatus. The method includes: first determining a mood information mode that corresponds to an application program, acquiring mood information of a message sender if the mood information mode that corresponds to the application program is transmitting a mood or correcting a mood, and then sending the mood information of the message sender to a message receiver. The embodiments of the present invention are applicable to outputting mood information of a user in an application program.

21 Claims, 7 Drawing Sheets

(56) References Cited

U.S. PATENT DOCUMENTS

2009/0002178 A1* 1/2009 Guday ............... A61B 5/0002
340/573.1
2012/0280951 A1* 11/2012 Bychkov ............... G06Q 50/24
345/184
2013/0268611 A1 10/2013 Pattan

FOREIGN PATENT DOCUMENTS

| CN | 103491251 A | 1/2014 |
| CN | 103905296 A | 7/2014 |
| WO | 2013/158768 A1 | 10/2013 |

* cited by examiner

MOOD INFORMATION PROCESSING METHOD AND APPARATUS

CROSS-REFERENCE TO RELATED APPLICATIONS

This application is a continuation of International Application No. PCT/CN2014/094120, filed on Dec. 17, 2014, which claims priority to Chinese Patent Application No. 201410119539.9, filed on Mar. 27, 2014. The disclosures of the aforementioned applications are hereby incorporated by reference in their entireties.

TECHNICAL FIELD

The present invention relates to the field of information technologies, and in particular, to a mood information processing method and apparatus.

BACKGROUND

As information technologies develop, functions of terminal devices are becoming increasingly intelligent. For example, a terminal device not only can assist in managing personal information and data of a user, but also can analyze information such as a mood status or a scenario of the user by using acquired data.

Currently, in a process of running an application program, a terminal device first receives message content entered by a message sender, and then sends the message content to a corresponding message receiver. However, when sending the message content to the message receiver, the terminal device sends a corresponding message directly according to the message content entered by the message sender, resulting in that an intelligence degree of sending a message by a terminal device is relatively low.

SUMMARY

Embodiments of the present invention provide a mood information processing method and apparatus, which can improve an intelligence degree of sending a message by a terminal device.

The following technical solutions are used in the embodiments of the present invention.

According to a first aspect, an embodiment of the present invention provides a mood information processing method, including:

determining a mood information mode that corresponds to an application program, where the mood information mode includes: not transmitting a mood, transmitting a mood, and correcting a mood;

acquiring mood information of a message sender if the mood information mode that corresponds to the application program is the transmitting a mood or the correcting a mood, where the message sender sends a message to a message receiver by using the application program; and sending the mood information of the message sender to the message receiver.

With reference to the first aspect, in a first possible implementation manner of the first aspect, before the step of acquiring mood information of a message sender, the method further includes:

determining a mood information mode that corresponds to the message receiver; and the step of acquiring mood information of a message sender includes:

acquiring the mood information of the message sender if the mood information mode that corresponds to the message receiver is the transmitting a mood or the correcting a mood.

With reference to the first aspect, in a second possible implementation manner of the first aspect, before the step of acquiring mood information of a message sender, the method further includes:

when the mood information mode that corresponds to the application program is the correcting a mood, determining whether a mood information mode that corresponds to the message receiver is the correcting a mood; and correcting the mood information of the message sender if the mood information mode that corresponds to the message receiver is the correcting a mood; and the step of sending the mood information of the message sender to the message receiver includes:

sending the corrected mood information of the message sender to the message receiver.

With reference to the first aspect, the first possible implementation manner of the first aspect or the second possible implementation manner of the first aspect, in a third possible implementation manner of the first aspect, before the step of determining a mood information mode that corresponds to an application program, the method further includes:

receiving a voice operation instruction, where the voice operation instruction carries an application program that needs to send a message and the message receiver; and running the application program that needs to send a message; and the step of acquiring mood information of a message sender if the mood information mode that corresponds to the application program is the transmitting a mood or the correcting a mood includes:

acquiring the mood information of the message sender according to the voice operation instruction if the mood information mode that corresponds to the application program is the transmitting a mood or the correcting a mood.

With reference to the third possible implementation manner of the first aspect, in a fourth possible implementation manner of the first aspect, the voice operation instruction carries identity information of an instruction sender;

before the step of running the application program that needs to send a message, the method further includes:

verifying, according to the identity information of the instruction sender, whether the instruction sender is the message sender; and the step of running the application program that needs to send a message includes:

if the instruction sender is the message sender, running the application program that needs to send a message.

With reference to the third possible implementation manner of the first aspect or the fourth possible implementation manner of the first aspect, in a fifth possible implementation manner of the first aspect, after the step of acquiring the mood information of the message sender according to the voice operation instruction, the method further includes:

acquiring another piece of mood information according to expression information or a physiological parameter of the message sender; and determining whether the mood information of the message sender is the same as the other piece of mood information; and the step of sending the mood information of the message sender to the message receiver includes:

sending the mood information of the message sender to the message receiver if the mood information of the message sender is the same as the other piece of mood information.

With reference to the first aspect, in a sixth possible implementation manner of the first aspect, when the application program is a voice call, the step of acquiring mood information of a message sender if the mood information mode that corresponds to the application program is the transmitting a mood or the correcting a mood includes:

acquiring the mood information of the message sender from voice information if the mood information mode that corresponds to the application program is the correcting a mood;

after the step of acquiring the mood information of the message sender from voice information, the method further includes:

correcting the mood information of the message sender; and the step of sending the mood information of the message sender to the message receiver includes:

sending the corrected mood information of the message sender to the message receiver.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect or the sixth possible implementation manner of the first aspect, in a seventh possible implementation manner of the first aspect, the step of sending the mood information of the message sender to the message receiver includes:

sending an emoticon that corresponds to the mood information of the message sender to the message receiver; or sending a special font that corresponds to the mood information of the message sender to the message receiver; or sending a background picture that corresponds to the mood information of the message sender to the message receiver.

According to a second aspect, an embodiment of the present invention provides a mood information processing apparatus, including:

a determining unit, configured to determine a mood information mode that corresponds to an application program, where the mood information mode includes: not transmitting a mood, transmitting a mood, and correcting a mood;

an acquiring unit, configured to acquire mood information of a message sender when the determining unit determines that the mood information mode that corresponds to the application program is the transmitting a mood or the correcting a mood, where the message sender sends a message to a message receiver by using the application program; and a sending unit, configured to send the mood information of the message sender that is acquired by the acquiring unit to the message receiver.

With reference to the second aspect, in a first possible implementation manner of the second aspect, the determining unit is further configured to determine a mood information mode that corresponds to the message receiver; and the acquiring unit is specifically configured to acquire the mood information of the message sender when the determining unit determines that the mood information mode that corresponds to the message receiver is the transmitting a mood or the correcting a mood.

With reference to the second aspect, in a second possible implementation manner of the second aspect, the determining unit is further configured to: when the mood information mode that corresponds to the application program is the correcting a mood, determine whether a mood information mode that corresponds to the message receiver is the correcting a mood;

the apparatus further includes a correction unit, where the correction unit is configured to correct the mood information of the message sender when the determining unit determines that the mood information mode that corresponds to the message receiver is the correcting a mood; and the sending unit is specifically configured to send the mood information of the message sender that is corrected by the correction unit to the message receiver.

With reference to the second aspect, the first possible implementation manner of the second aspect or the second possible implementation manner of the second aspect, in a third possible implementation manner of the second aspect, the apparatus further includes a receiving unit and a running unit, where the receiving unit is configured to receive a voice operation instruction, where the voice operation instruction carries an application program that needs to send a message and the message receiver;

the running unit is configured to run the application program that needs to send a message received by the receiving unit; and the acquiring unit is specifically configured to acquire the mood information of the message sender according to the voice operation instruction when the determining unit determines that the mood information mode that corresponds to the application program is the transmitting a mood or the correcting a mood.

With reference to the third possible implementation manner of the second aspect, in a fourth possible implementation manner of the second aspect, the voice operation instruction received by the receiving unit carries identity information of an instruction sender;

the apparatus further includes a verification unit, where the verification unit is configured to verify, according to the identity information of the instruction sender that is received by the receiving unit, whether the instruction sender is the message sender; and the running unit is specifically configured to run the application program that needs to send a message when the verification unit verifies that the instruction sender is the message sender.

With reference to the third possible implementation manner of the second aspect or the fourth possible implementation manner of the second aspect, in a fifth possible implementation manner of the second aspect, the acquiring unit is further configured to acquire another piece of mood information according to expression information or a physiological parameter of the message sender;

the apparatus further includes a judging unit, where the judging unit is configured to determine whether the mood information of the message sender is the same as the other piece of mood information that is acquired by the acquiring unit; and the sending unit is specifically configured to send the mood information of the message sender to the message receiver when the judging unit determines that the mood information of the message sender is the same as the other piece of mood information.

With reference to the second aspect, in a sixth possible implementation manner of the second aspect, when the application program is a voice call, the acquiring unit is specifically configured to acquire the mood information of the message sender from voice information when the determining unit determines that the mood information mode that corresponds to the application program is the correcting a mood;

the correction unit is further configured to correct the mood information of the message sender that is acquired by the acquiring unit; and the sending unit is specifically configured to send the mood information of the message sender that is corrected by the correction unit to the message receiver.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect or the sixth possible implementation manner of the second aspect, in a seventh possible implementation manner of the second aspect, the sending unit is specifically configured to send an emoticon that corresponds to the mood information of the message sender to the message receiver;

the sending unit is specifically further configured to send a special font that corresponds to the mood information of the message sender to the message receiver; and the sending unit is specifically further configured to send a background picture that corresponds to the mood information of the message sender to the message receiver.

According to a third aspect, an embodiment of the present invention provides a terminal device, including:

a processor, configured to determine a mood information mode that corresponds to an application program, and acquire mood information of a message sender when the mood information mode that corresponds to the application program is the transmitting a mood or the correcting a mood, where the mood information mode includes: not transmitting a mood, transmitting a mood, and correcting a mood, and the message sender sends a message to a message receiver by using the application program; and a transmitter, configured to send the mood information of the message sender that is acquired by the processor to the message receiver.

With reference to the third aspect, in a first possible implementation manner of the third aspect, the processor is further configured to determine a mood information mode that corresponds to the message receiver; and the processor is specifically configured to acquire the mood information of the message sender when the mood information mode that corresponds to the message receiver is the transmitting a mood or the correcting a mood.

With reference to the third aspect, in a second possible implementation manner of the third aspect, the processor is further configured to: when the mood information mode that corresponds to the application program is the correcting a mood, determine whether a mood information mode that corresponds to the message receiver is the correcting a mood;

the processor is further configured to correct the mood information of the message sender when the mood information mode that corresponds to the message receiver is the correcting a mood; and the transmitter is specifically configured to send the mood information of the message sender that is corrected by the processor to the message receiver.

With reference to the third aspect, the first possible implementation manner of the third aspect or the second possible implementation manner of the third aspect, in a third possible implementation manner of the third aspect, the terminal device further includes a receiver, where the receiver is configured to receive a voice operation instruction, where the voice operation instruction carries an application program that needs to send a message and the message receiver;

the processor is further configured to run the application program that needs to send a message received by the receiver; and the processor is specifically configured to acquire the mood information of the message sender according to the voice operation instruction when the mood information mode that corresponds to the application program is the transmitting a mood or the correcting a mood.

With reference to the third possible implementation manner of the third aspect, in a fourth possible implementation manner of the third aspect, the voice operation instruction received by the receiver carries identity information of an instruction sender;

the processor is further configured to verify, according to the identity information of the instruction sender that is received by the receiver, whether the instruction sender is the message sender; and the processor is specifically configured to run the application program that needs to send a message when the instruction sender is the message sender.

With reference to the third possible implementation manner of the third aspect or the fourth possible implementation manner of the third aspect, in a fifth possible implementation manner of the third aspect, the processor is further configured to acquire another piece of mood information according to expression information or a physiological parameter of the message sender;

the processor is further configured to determine whether the mood information of the message sender is the same as the other piece of mood information; and the transmitter is specifically configured to send the mood information of the message sender to the message receiver when the processor determines that the mood information of the message sender is the same as the other piece of mood information.

With reference to the third aspect, in a sixth possible implementation manner of the third aspect, when the application program is a voice call, the processor is specifically configured to acquire the mood information of the message sender from voice information when the mood information mode that corresponds to the application program is the correcting a mood;

the processor is further configured to correct the mood information of the message sender; and the transmitter is specifically configured to send the mood information of the message sender that is corrected by the processor to the message receiver.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect or the sixth possible implementation manner of the third aspect, in a seventh possible implementation manner of the third aspect, the transmitter is specifically configured to send an emoticon that corresponds to the mood information of the message sender to the message receiver;

the transmitter is specifically further configured to send a special font that corresponds to the mood information of the message sender to the message receiver; and the transmitter is specifically further configured to send a background picture that corresponds to the mood information of the message sender to the message receiver.

According to the mood information processing method and apparatus provided in the embodiments of the present invention, first a mood information mode that corresponds to an application program is determined, mood information of a message sender is acquired if the mood information mode that corresponds to the application program is transmitting a mood or correcting a mood, and then the mood information of the message sender is sent to a message receiver. Compared with sending a corresponding message directly according to message content entered by a message sender, in this embodiment of the present invention, current mood information of a message sender is intelligently acquired, and the current mood information of the message sender can be output, so that an intelligence degree of sending a message by a terminal device can be improved, and user experience can further be improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To make the advantages of the present invention clearer, the present invention is described below in detail with reference to accompanying drawings and the embodiments.

Figure 1:
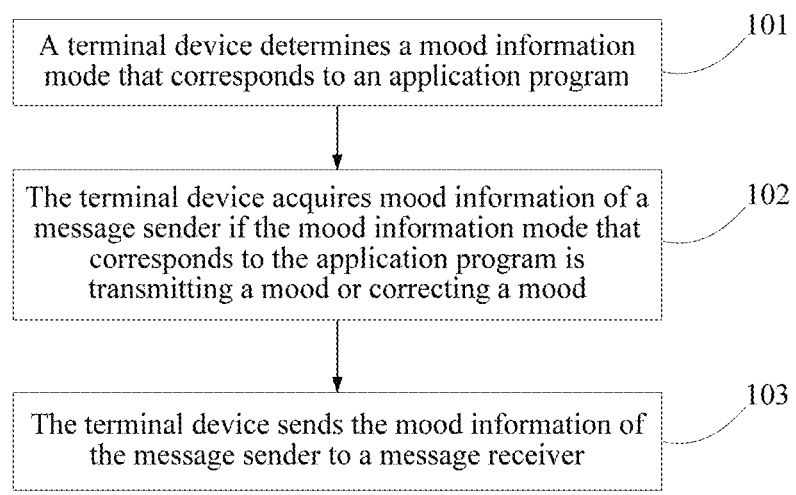
FIG. 1 is a flowchart of a mood information processing method according to an embodiment of the present invention.

An embodiment of the present invention provides a mood information processing method. As shown in FIG. 1, the method includes:

101. A terminal device determines a mood information mode that corresponds to an application program.

The mood information mode that corresponds to the application program includes not transmitting a mood, transmitting a mood, and correcting a mood.

For this embodiment of the present invention, when the mood information mode that corresponds to the application program is the not transmitting a mood, the terminal device does not allow the application program to acquire mood information of a message sender; when the mood information mode that corresponds to the application program is the transmitting a mood, the terminal device allows the application program to acquire mood information of a message sender; and when the mood information mode that corresponds to the application program is the correcting a mood, the terminal device allows the application program to acquire mood information of a message sender, and corrects the mood information of the message sender according to a rule. In this embodiment of the present invention, if the message sender does not set a corresponding mood information mode for a particular application program, by default a mood information mode that corresponds to the application program is the not transmitting a mood.

For this embodiment of the present invention, the mood information mode that corresponds to the application program may be: not transmitting a mood, transmitting a mood, correcting a mood, and transmitting a mood and correcting a mood.

Specifically, when the mood information mode that corresponds to the application program is the transmitting a mood, the message sender may arbitrarily set whether a mood information mode that respectively corresponds to each message receiver of the application program is the transmitting a mood, and if the message sender does not set the mood information mode, by default the mood information mode that corresponds to each message receiver of the application program is the transmitting a mood. When the mood information mode that corresponds to the application program is the correcting a mood, the message sender may arbitrarily set whether a mood information mode that respectively corresponds to each message receiver of the application program is the correcting a mood, and if the message sender does not set the mood information mode, by default the mood information mode that corresponds to each message receiver of the application program is the correcting a mood. When the mood information mode that corresponds to the application program is the transmitting a mood and the correcting a mood, the message sender may arbitrarily set whether a mood information mode that respectively corresponds to each message receiver of the application program is the transmitting a mood and the correcting a mood.

When the mood information mode that corresponds to the application program is the transmitting a mood and the correcting a mood, if a particular message receiver is set to be the not transmitting a mood and not correcting a mood, a mood information mode that corresponds to the message receiver is the not transmitting a mood. If a particular message receiver is set to be the not transmitting a mood and the correcting a mood, a mood information mode that corresponds to the message receiver is the correcting a mood. If a particular message receiver is set to be the transmitting a mood and not correcting a mood, a mood information mode that corresponds to the message receiver is the transmitting a mood. If a particular message receiver is set to be the transmitting a mood and the correcting a mood, mood information that corresponds to the message receiver is the correcting a mood.

For this embodiment of the present invention, a message receiver when the mood information mode that corresponds to the application program is the transmitting a mood and a message receiver when the mood information mode that corresponds to the application program is the correcting a mood are separately set, so that message receivers when a mood information mode is the not transmitting a mood, the transmitting a mood, and the correcting a mood are respectively set in a same application program according to subjective willingness of a message sender, and user experience can be further improved.

102. The terminal device acquires mood information of a message sender if the mood information mode that corresponds to the application program is transmitting a mood or correcting a mood.

The message sender sends a message to the message receiver by using the application program. In this embodiment of the present invention, the message sender may be a holder of a terminal device; the message receiver may be contacts that correspond to the application program; and the application program may be various chat application programs, call application programs, game application programs or the like. For example, when the application program is a chat application program, the message receiver may be chat friends in the chat application program. When the application program is a call application program, the message receiver may be contacts in the call application program. When the application program is a game application program, the message receiver may be game friends in the game application program.

For this embodiment of the present invention, the mood information acquired by the terminal device may be any one or any combination of the following mood information: mood information that is acquired by using voice information, mood information that is acquired by using expression information, mood information that is acquired by using a physiological parameter, and the like.

Optionally, the terminal device may collect a recent call record or a recent voice chat record of a message sender, and perform intelligent analysis on a tone, a speaking speed or the like of the message sender in the call record or the voice chat record, to acquire mood information that corresponds to the message sender.

Alternatively, the terminal device may further collect recent photos of the message sender, and analyze facial expressions of the message sender in these photos, to acquire mood information that corresponds to the message sender. In this embodiment of the present invention, a photo collected by the terminal device may be a common self-portrait photo, a facial recognition and certification photo or the like.

Alternatively, the terminal device may further collect recent physiological parameters such as heartbeat and blood pressure of the message sender by using a smart device associated with the terminal device, to acquire mood information that corresponds to the message sender. In this embodiment of the present invention, the smart device associated with the terminal device may be a smart watch, a smart wristband or the like.

103. The terminal device sends the mood information of the message sender to a message receiver.

Optionally, step 103 may be: The terminal device sends an emoticon that corresponds to the mood information of the message sender to the message receiver. In this embodiment of the present invention, the emoticon that corresponds to the mood information may be an emoticon corresponding to happiness, sadness, tears, surprise or the like.

Alternatively, step 103 may further be: The terminal device sends a special font that corresponds to the mood information of the message sender to the message receiver. In this embodiment of the present invention, the terminal device presets a correspondence between mood information and a special font, so that after current mood information of the message sender is acquired, content that needs to be output by the message sender can be output according to a font corresponding to the mood information. For example, the terminal device may preset that a special font corresponding to happiness is a font such as SimYou, or may preset that a special font corresponding to sadness is SimHei or the like.

Alternatively, step 103 may further be: The terminal device sends a background picture that corresponds to the mood information of the message sender to the message receiver. In this embodiment of the present invention, a correspondence between mood information and a background picture is preset, so that after current mood information of the message sender is acquired, content that needs to be output by the message sender can be output according to a background picture corresponding to the mood information. For example, the terminal device may preset that a background picture corresponding to happiness is a picture full of sunshine, or may preset that a background picture corresponding to sadness is a picture of a rainy day, or the like.

According to the mood information processing method and apparatus provided in this embodiment of the present invention, first a mood information mode that corresponds to an application program is determined, mood information of a message sender is acquired if the mood information mode that corresponds to the application program is transmitting a mood or correcting a mood, and then the mood information of the message sender is sent to a message receiver. Compared with sending a corresponding message directly according to message content entered by a message sender, in this embodiment of the present invention, current mood information of a message sender is intelligently acquired, and the current mood information of the message sender can be output, so that an intelligence degree of sending a message by a terminal device can be improved, and user experience can further be improved.

Figure 2:
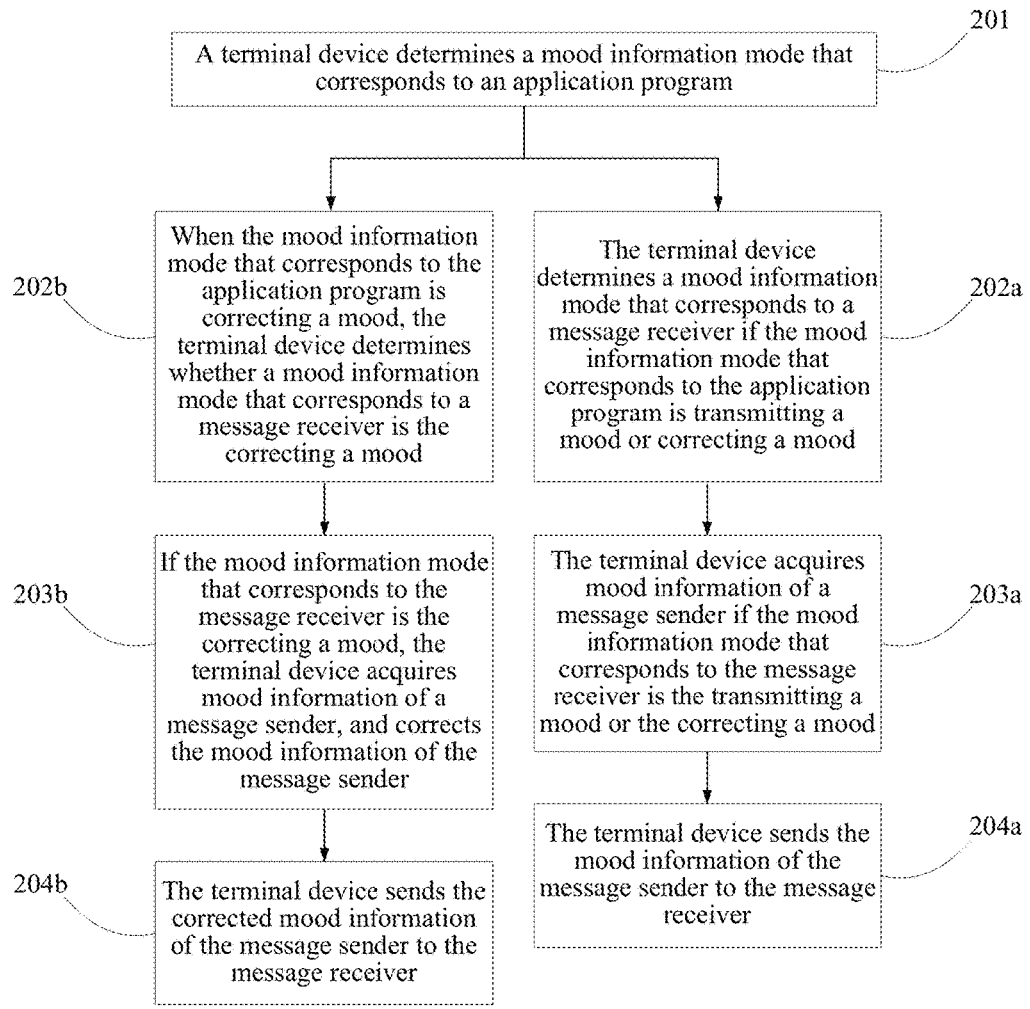
FIG. 2 is a flowchart of another mood information processing method according to an embodiment of the present invention.

An embodiment of the present invention provides another mood information processing method. As shown in FIG. 2, the method includes:

201. A terminal device determines a mood information mode that corresponds to an application program.

The mood information mode that corresponds to the application program includes not transmitting a mood, transmitting a mood, and correcting a mood.

For this embodiment of the present invention, when the mood information mode that corresponds to the application program is the not transmitting a mood, the terminal device does not allow the application program to acquire mood information of a message sender; when the mood information mode that corresponds to the application program is the transmitting a mood, the terminal device allows the application program to acquire mood information of a message sender; and when the mood information mode that corresponds to the application program is the correcting a mood, the terminal device allows the application program to acquire mood information of a message sender, and corrects the mood information of the message sender according to a rule. In this embodiment of the present invention, if a message sender does not set a corresponding mood information mode for a particular application program, by default a mood information mode that corresponds to the application program is the not transmitting a mood.

202a. The terminal device determines a mood information mode that corresponds to a message receiver if the mood information mode that corresponds to the application program is transmitting a mood or correcting a mood.

The message sender sends a message to the message receiver by using the application program. In this embodiment of the present invention, the message sender may be a holder of a terminal device; the message receiver may be contacts that correspond to the application program; and the application program may be various chat application programs, call application programs, game application programs or the like. For example, when the application program is a chat application program, the message receiver may be chat friends in the chat application program. When the application program is a call application program, the message receiver may be contacts in the call application program. When the application program is a game application program, the message receiver may be game friends in the game application program.

For this embodiment of the present invention, the mood information mode that corresponds to the application program may be: not transmitting a mood, transmitting a mood, correcting a mood, and transmitting a mood and correcting a mood.

Specifically, when the mood information mode that corresponds to the application program is the transmitting a mood, the message sender may arbitrarily set whether a mood information mode that respectively corresponds to each message receiver of the application program is the transmitting a mood, and if the message sender does not set the mood information mode, by default the mood information mode that corresponds to each message receiver of the application program is the transmitting a mood. When the mood information mode that corresponds to the application program is the correcting a mood, the message sender may arbitrarily set whether a mood information mode that respectively corresponds to each message receiver of the application program is the correcting a mood, and if the message sender does not set the mood information mode, by default the mood information mode that corresponds to each message receiver of the application program is the correcting a mood. When the mood information mode that corresponds to the application program is the transmitting a mood and the correcting a mood, the message sender may arbitrarily set whether a mood information mode that respectively corresponds to each message receiver of the application program is the transmitting a mood and the correcting a mood.

When the mood information mode that corresponds to the application program is the transmitting a mood and the correcting a mood, if a particular message receiver is set to be the not transmitting a mood and not correcting a mood, a mood information mode that corresponds to the message receiver is the not transmitting a mood. If a particular message receiver is set to be the not transmitting a mood and the correcting a mood, a mood information mode that corresponds to the message receiver is the correcting a mood. If a particular message receiver is set to be the transmitting a mood and not correcting a mood, a mood information mode that corresponds to the message receiver is the transmitting a mood. If a particular message receiver is set to be the transmitting a mood and the correcting a mood, mood information that corresponds to the message receiver is the correcting a mood.

For this embodiment of the present invention, a message receiver when the mood information mode that corresponds to the application program is the transmitting a mood and a message receiver when the mood information mode that corresponds to the application program is the correcting a mood are separately set, so that message receivers when a mood information mode is the not transmitting a mood, the transmitting a mood, and the correcting a mood are respectively set in a same application program according to subjective willingness of a message sender, and user experience can be further improved.

After step 202a, step 203a. The terminal device acquires mood information of a message sender if the mood information mode that corresponds to the message receiver is the transmitting a mood or the correcting a mood.

For this embodiment of the present invention, the mood information acquired by the terminal device may be any one or any combination of the following mood information: mood information that is acquired by using voice information, mood information that is acquired by using expression information, mood information that is acquired by using a physiological parameter, and the like.

Optionally, the terminal device may collect a recent call record or a recent voice chat record of a message sender, and perform intelligent analysis on a tone, a speaking speed or the like of the message sender in the call record or the voice chat record, to acquire mood information that corresponds to the message sender.

Alternatively, the terminal device may further collect recent photos of the message sender, and analyze facial expressions of the message sender in these photos, to acquire mood information that corresponds to the message sender. In this embodiment of the present invention, a photo collected by the terminal device may be a common self-portrait photo, a facial recognition and certification photo or the like.

Alternatively, the terminal device may further collect recent physiological parameters such as heartbeat and blood pressure of the message sender by using a smart device associated with the terminal device, to acquire mood information that corresponds to the message sender. In this embodiment of the present invention, the smart device associated with the terminal device may be a smart watch, a smart wristband or the like.

After 203a, step 204a. The terminal device sends the mood information of the message sender to the message receiver.

Optionally, step 204a may be: The terminal device sends an emoticon that corresponds to the mood information of the message sender to the message receiver. In this embodiment of the present invention, the emoticon that corresponds to the mood information may be an emoticon corresponding to happiness, sadness, tears, surprise or the like.

Alternatively, step 204a may further be: The terminal device sends a special font that corresponds to the mood information of the message sender to the message receiver. In this embodiment of the present invention, the terminal device presets a correspondence between mood information and a special font, so that after current mood information of the message sender is acquired, content that needs to be output by the message sender can be output according to a font corresponding to the mood information. For example, the terminal device may preset that a special font corresponding to happiness is a font such as SimYou, or may preset that a special font corresponding to sadness is SimHei or the like.

Alternatively, step 204a may further be: The terminal device sends a background picture that corresponds to the mood information of the message sender to the message receiver. In this embodiment of the present invention, a correspondence between mood information and a background picture is preset, so that after current mood information of the message sender is acquired, content that needs to be output by the message sender can be output according to a background picture corresponding to the mood information. For example, the terminal device may preset that a background picture corresponding to happiness is a picture full of sunshine, or may preset that a background picture corresponding to sadness is a picture of a rainy day, or the like.

Parallel to step 202a, step 202b. When the mood information mode that corresponds to the application program is correcting a mood, the terminal device determines whether a mood information mode that corresponds to a message receiver is the correcting a mood.

The mood information mode that corresponds to the message receiver includes not transmitting a mood, transmitting a mood, and correcting a mood.

For this embodiment of the present invention, when the mood information mode that corresponds to the message receiver is the not transmitting a mood, the terminal device does not allow the message receiver to acquire mood information of a message sender; when the mood information mode that corresponds to the message receiver is the transmitting a mood, the terminal device allows the message receiver to acquire mood information of a message sender; and when the mood information mode that corresponds to the message receiver is the correcting a mood, the terminal device allows the message receiver to acquire mood information of a message sender, and corrects the mood information of the message sender according to a rule. In this embodiment of the present invention, if a message sender does not set a corresponding mood information mode for a particular message receiver, by default a mood information mode that corresponds to the application program is the not transmitting a mood.

After step 202b, step 203b. If the mood information mode that corresponds to the message receiver is the correcting a mood, the terminal device acquires mood information of a message sender, and corrects the mood information of the message sender.

For this embodiment of the present invention, the terminal device may correct the mood information according to a preset rule. For example, the terminal device may correct negative mood information to positive mood information, or may correct a negative mood to a positive mood for a particular message receiver. In this embodiment of the present invention, after current mood information of the message sender is acquired, the mood information is corrected, which can prevent a negative mood from being output, so that user experience can be further improved.

After 203b, step 204b. The terminal device sends the corrected mood information of the message sender to the message receiver.

Optionally, step 204b may be: The terminal device sends an emoticon that corresponds to the corrected mood information of the message sender to the message receiver. In this embodiment of the present invention, the emoticon that corresponds to the mood information may be an emoticon corresponding to happiness, sadness, tears, surprise or the like.

Alternatively, step 204b may further be: The terminal device sends a special font that corresponds to the corrected mood information of the message sender to the message receiver. In this embodiment of the present invention, the terminal device presets a correspondence between mood information and a special font, so that after current mood information of the message sender is acquired, content that needs to be output by the message sender can be output according to a font corresponding to the mood information. For example, the terminal device may preset that a special font corresponding to happiness is a font such as SimYou, or may preset that a special font corresponding to sadness is SimHei or the like.

Alternatively, step 204b may further be: The terminal device sends a background picture that corresponds to the corrected mood information of the message sender to the message receiver. In this embodiment of the present invention, a correspondence between mood information and a background picture is preset, so that after current mood information of the message sender is acquired, content that needs to be output by the message sender can be output according to a background picture corresponding to the mood information. For example, the terminal device may preset that a background picture corresponding to happiness is a picture full of sunshine, or may preset that a background picture corresponding to sadness is a picture of a rainy day, or the like.

According to the mood information processing method and apparatus provided in this embodiment of the present invention, first a mood information mode that corresponds to an application program is determined, mood information of a message sender is acquired if the mood information mode that corresponds to the application program is transmitting a mood or correcting a mood, and then the mood information of the message sender is sent to a message receiver. Compared with sending a corresponding message directly according to message content entered by a message sender, in this embodiment of the present invention, current mood information of a message sender is intelligently acquired, and the current mood information of the message sender can be output, so that an intelligence degree of sending a message by a terminal device can be improved, and user experience can further be improved.

Figure 3:
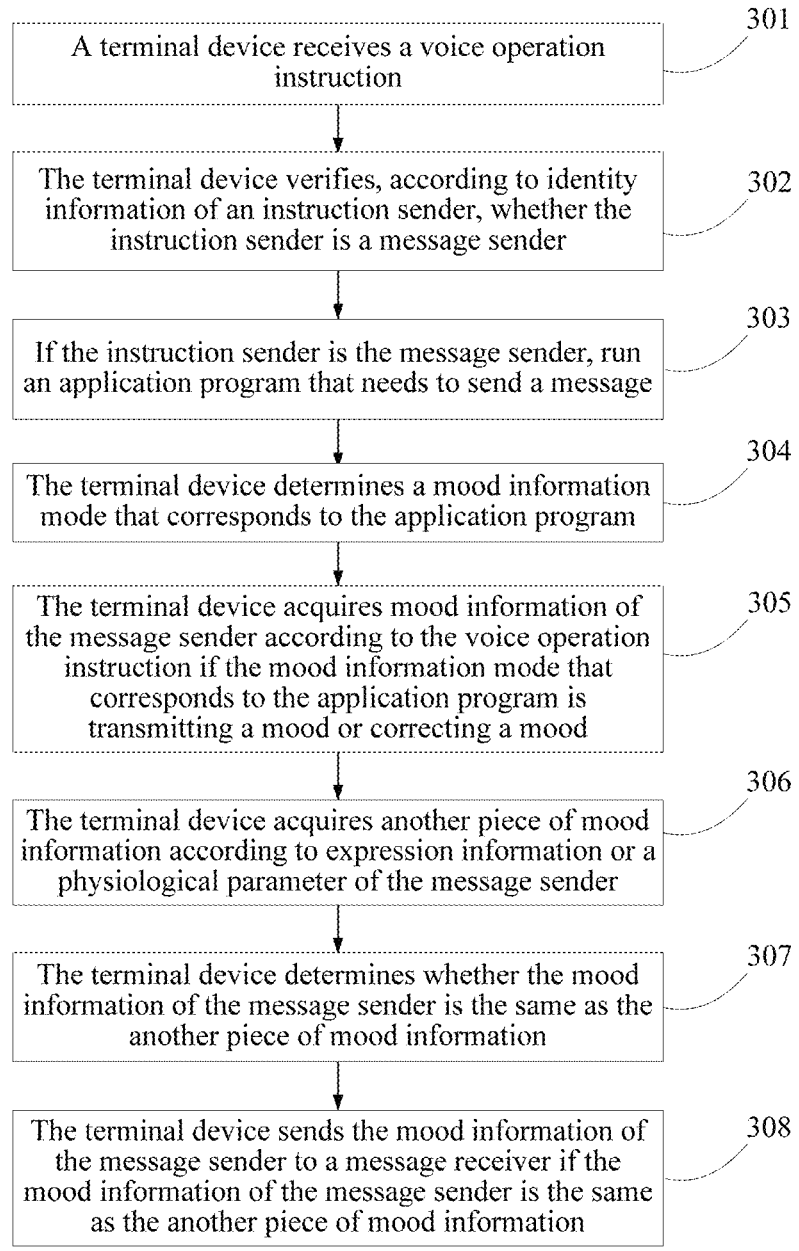
FIG. 3 is a flowchart of another mood information processing method according to an embodiment of the present invention.

An embodiment of the present invention provides another mood information processing method. As shown in FIG. 3, the method includes:

301. A terminal device receives a voice operation instruction.

The voice operation instruction carries an application program that needs to send information and a message receiver. For example, the voice operation instruction may be: send a message to tell my wife that I do not have to work overtime tonight, and I am driving home. In the voice operation instruction, the application program that needs to perform an operation is a message application program, the message receiver is the wife of the message sender, and output content is: I do not have to work overtime tonight, and I am driving home.

302. The terminal device verifies, according to identity information of an instruction sender, whether the instruction sender is a message sender.

The voice operation instruction carries the identity information of the instruction sender. In this embodiment of the present invention, the instruction sender is a sender corresponding to a voice operation instruction, and the message sender is a sender that can perform a corresponding operation by using the terminal device.

For this embodiment of the present invention, authentication is performed on a voice operation instruction, which can prevent a person except the message sender from incorrectly sending a voice operation instruction, so that user experience can be further improved.

303. If the instruction sender is the message sender, run an application program that needs to send a message.

For this embodiment of the present invention, a voice operation instruction is analyzed, so that an application program that needs to send a message can be determined. For example, the voice operation instruction may be: send a message to tell the professor to meet up at nine o'clock, where in the voice operation instruction, the application program that needs to send a message is a message application program; or the voice operation instruction may be: tell may WeChat friend Xiaoming that the place is the library, where in the voice operation instruction, the application program that needs to send a message is WeChat.

For this embodiment of the present invention, when an application program that needs to send a message is not specified in the voice operation instruction, the terminal device can determine, by means of analysis, multiple application programs that can implement the voice operation instruction. In this case, the terminal device runs an application program having the highest priority of the multiple application programs. Priorities of the multiple application programs of the terminal device may be configured by the message sender, or may be configured by the terminal device by analyzing a use habit of the message sender.

For example, the voice operation instruction is: tell my mom I will be home right away, where the application program that needs to send a message and that is carried in the voice operation instruction may be SMS, WeChat, Fetion, QQ, Microblog or the like. In this case, if an application program having the highest priority of these application programs is WeChat, the terminal device runs WeChat.

304. The terminal device determines a mood information mode that corresponds to the application program.

The mood information mode that corresponds to the application program includes not transmitting a mood, transmitting a mood, and correcting a mood.

For this embodiment of the present invention, when the mood information mode that corresponds to the application program is the not transmitting a mood, the terminal device does not allow the application program to acquire mood information of a message sender; when the mood information mode that corresponds to the application program is the transmitting a mood, the terminal device allows the application program to acquire mood information of a message sender; and when the mood information mode that corresponds to the application program is the correcting a mood, the terminal device allows the application program to acquire mood information of a message sender, and corrects the mood information of the message sender according to a rule. In this embodiment of the present invention, if a message sender does not set a corresponding mood information mode for a particular application program, by default a mood information mode that corresponds to the application program is the not transmitting a mood.

For this embodiment of the present invention, the mood information mode that corresponds to the application program may be: not transmitting a mood, transmitting a mood, correcting a mood, and transmitting a mood and correcting a mood.

Specifically, when the mood information mode that corresponds to the application program is the transmitting a mood, the message sender may arbitrarily set whether a mood information mode that respectively corresponds to each message receiver of the application program is the transmitting a mood, and if the message sender does not set the mood information mode, by default the mood information mode that corresponds to each message receiver of the application program is the transmitting a mood. When the mood information mode that corresponds to the application program is the correcting a mood, the message sender may arbitrarily set whether a mood information mode that respectively corresponds to each message receiver of the application program is the correcting a mood, and if the message sender does not set the mood information mode, by default the mood information mode that corresponds to each message receiver of the application program is the correcting a mood. When the mood information mode that corresponds to the application program is the transmitting a mood and the correcting a mood, the message sender may arbitrarily set whether a mood information mode that respectively corresponds to each message receiver of the application program is the transmitting a mood and the correcting a mood.

When the mood information mode that corresponds to the application program is the transmitting a mood and the correcting a mood, if a particular message receiver is set to be the not transmitting a mood and not correcting a mood, a mood information mode that corresponds to the message receiver is the not transmitting a mood. If a particular message receiver is set to be the not transmitting a mood and the correcting a mood, a mood information mode that corresponds to the message receiver is the correcting a mood. If a particular message receiver is set to be the transmitting a mood and not correcting a mood, a mood information mode that corresponds to the message receiver is the transmitting a mood. If a particular message receiver is set to be the transmitting a mood and the correcting a mood, mood information that corresponds to the message receiver is the correcting a mood.

For this embodiment of the present invention, a message receiver when the mood information mode that corresponds to the application program is the transmitting a mood and a message receiver when the mood information mode that corresponds to the application program is the correcting a mood are separately set, so that message receivers when a mood information mode is the not transmitting a mood, the transmitting a mood, and the correcting a mood are respectively set in a same application program according to subjective willingness of a message sender, and user experience can be further improved.

305. The terminal device acquires mood information of the message sender according to the voice operation instruction if the mood information mode that corresponds to the application program is transmitting a mood or correcting a mood.

For this embodiment of the present invention, the terminal device may perform intelligent analysis on a tone, a speaking speed or the like of the message sender in the voice operation instruction, to acquire mood information of the message sender. For example, the mood information that is acquired according to the voice operation instruction may be happiness, anxiety, impatience or the like.

Optionally, step 305 may be: If the mood information mode that corresponds to the application program is transmitting a mood or correcting a mood, the terminal device determines a mood information mode that corresponds to a message receiver, and if the mood information mode that corresponds to the message receiver is the transmitting a mood or the correcting a mood, the terminal device acquires mood information of the message sender.

For this embodiment of the present invention, a message receiver when the mood information mode that corresponds to the application program is the transmitting a mood and a message receiver when the mood information mode that corresponds to the application program is the correcting a mood are separately set, so that message receivers when a mood information mode is the not transmitting a mood, the transmitting a mood, and the correcting a mood are respectively set in a same application program according to subjective willingness of a message sender, and user experience can be further improved.

Optionally, step 305 may further be: When the mood information mode that corresponds to the application program is correcting a mood, the terminal device determines whether a mood information mode that corresponds to a message receiver is the correcting a mood, and if the mood information mode that corresponds to the message receiver is the correcting a mood, the terminal device acquires mood information of the message sender, and corrects the mood information of the message sender.

The mood information mode that corresponds to the message receiver includes not transmitting a mood, transmitting a mood, and correcting a mood.

For this embodiment of the present invention, when the mood information mode that corresponds to the message receiver is the not transmitting a mood, the terminal device does not allow the message receiver to acquire mood information of a message sender; when the mood information mode that corresponds to the message receiver is the transmitting a mood, the terminal device allows the message receiver to acquire mood information of a message sender; and when the mood information mode that corresponds to the message receiver is the correcting a mood, the terminal device allows the message receiver to acquire mood information of a message sender, and corrects the mood information of the message sender according to a rule. In this embodiment of the present invention, if a message sender does not set a corresponding mood information mode for a particular message receiver, by default a mood information mode that corresponds to the application program is the not transmitting a mood.

For this embodiment of the present invention, the terminal device may correct the mood information according to a preset rule. For example, the terminal device may correct negative mood information to positive mood information, or may correct a negative mood to a positive mood for a particular message receiver. In this embodiment of the present invention, after current mood information of the message sender is acquired, the mood information is corrected, which can prevent a negative mood from being output, so that user experience can be further improved.

306. The terminal device acquires another piece of mood information according to expression information or a physiological parameter of the message sender.

The other piece of mood information acquired by the terminal device may be any one or any combination of the following mood information: mood information that is acquired by using voice information, mood information that is acquired by using expression information, mood information that is acquired by using a physiological parameter, and the like.

Optionally, the terminal device may collect a recent call record or a recent voice chat record of a message sender, and perform intelligent analysis on a tone, a speaking speed or the like of the message sender in the call record or the voice chat record, to acquire another piece of mood information that corresponds to the message sender.

Alternatively, the terminal device may further collect recent photos of the message sender, and analyze facial expressions of the message sender in these photos, to acquire another piece of mood information that corresponds to the message sender. In this embodiment of the present invention, a photo collected by the terminal device may be a common self-portrait photo, a facial recognition and certification photo or the like.

Alternatively, the terminal device may further collect recent physiological parameters such as heartbeat and blood pressure of the message sender by using a smart device associated with the terminal device, to acquire another piece of mood information that corresponds to the message sender. In this embodiment of the present invention, the smart device associated with the terminal device may be a smart watch, a smart wristband or the like.

307. The terminal device determines whether the mood information of the message sender is the same as the other piece of mood information.

Optionally, after step 307, the method may further include: if the mood information of the message sender is different from the other piece of mood information, sending, by the terminal device, the other piece of mood information to the message receiver.

Alternatively, after step 307, the method may further include: if the mood information of the message sender is different from the other piece of mood information, quitting, by the terminal device, sending the other piece of mood information to the message receiver.

308. The terminal device sends the mood information of the message sender to a message receiver if the mood information of the message sender is the same as the other piece of mood information.

Optionally, step 308 may be: The terminal device sends an emoticon that corresponds to the mood information of the message sender to the message receiver if the mood information of the message sender is the same as the other piece of mood information. In this embodiment of the present invention, the emoticon that corresponds to the mood information may be an emoticon corresponding to happiness, sadness, tears, surprise or the like.

Alternatively, step 308 may further be: The terminal device sends a special font that corresponds to the mood information of the message sender to the message receiver if the mood information of the message sender is the same as the other piece of mood information. In this embodiment of the present invention, the terminal device presets a correspondence between mood information and a special font, so that after current mood information of the message sender is acquired, content that needs to be output by the message sender can be output according to a font corresponding to the mood information. For example, the terminal device may preset that a special font corresponding to happiness is a font such as SimYou, or may preset that a special font corresponding to sadness is SimHei or the like.

Alternatively, step 308 may further be: The terminal device sends a background picture that corresponds to the mood information of the message sender to the message receiver if the mood information of the message sender is the same as the other piece of mood information.

In this embodiment of the present invention, a correspondence between mood information and a background picture is preset, so that after current mood information of the message sender is acquired, content that needs to be output by the message sender can be output according to a background picture corresponding to the mood information. For example, the terminal device may preset that a background picture corresponding to happiness is a picture full of sunshine, or may preset that a background picture corresponding to sadness is a picture of a rainy day, or the like.

According to the mood information processing method and apparatus provided in this embodiment of the present invention, first a mood information mode that corresponds to an application program is determined, mood information of a message sender is acquired if the mood information mode that corresponds to the application program is transmitting a mood or correcting a mood, and then the mood information of the message sender is sent to a message receiver. Compared with sending a corresponding message directly according to message content entered by a message sender, in this embodiment of the present invention, current mood information of a message sender is intelligently acquired, and the current mood information of the message sender can be output, so that an intelligence degree of sending a message by a terminal device can be improved, and user experience can further be improved.

Figure 4:
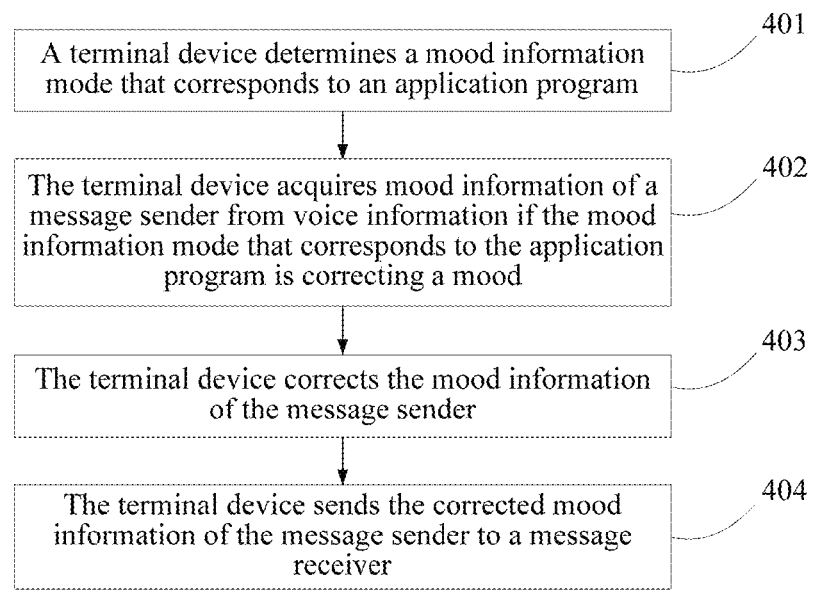
FIG. 4 is a flowchart of another mood information processing method according to an embodiment of the present invention.

An embodiment of the present invention provides another mood information processing method. As shown in FIG. 4, when an application program is a voice call, the method includes:

401. A terminal device determines a mood information mode that corresponds to an application program.

The mood information mode includes not transmitting a mood, transmitting a mood, and correcting a mood.

For this embodiment of the present invention, when the mood information mode that corresponds to the application program is the not transmitting a mood, the terminal device does not allow the application program to acquire mood information of a message sender; when the mood information mode that corresponds to the application program is the transmitting a mood, the terminal device allows the application program to acquire mood information of a message sender; and when the mood information mode that corresponds to the application program is the correcting a mood, the terminal device allows the application program to acquire mood information of a message sender, and corrects the mood information of the message sender according to a rule. In this embodiment of the present invention, if a message sender does not set a corresponding mood information mode for a particular application program, by default a mood information mode that corresponds to the application program is the not transmitting a mood.

For this embodiment of the present invention, the mood information mode that corresponds to the application program may be: not transmitting a mood, transmitting a mood, correcting a mood, and transmitting a mood and correcting a mood.

Specifically, when the mood information mode that corresponds to the application program is the transmitting a mood, the message sender may arbitrarily set whether a mood information mode that respectively corresponds to each message receiver of the application program is the transmitting a mood, and if the message sender does not set the mood information mode, by default the mood information mode that corresponds to each message receiver of the application program is the transmitting a mood. When the mood information mode that corresponds to the application program is the correcting a mood, the message sender may arbitrarily set whether a mood information mode that respectively corresponds to each message receiver of the application program is the correcting a mood, and if the message sender does not set the mood information mode, by default the mood information mode that corresponds to each message receiver of the application program is the correcting a mood. When the mood information mode that corresponds to the application program is the transmitting a mood and the correcting a mood, the message sender may arbitrarily set whether a mood information mode that respectively corresponds to each message receiver of the application program is the transmitting a mood and the correcting a mood.

When the mood information mode that corresponds to the application program is the transmitting a mood and the correcting a mood, if a particular message receiver is set to be the not transmitting a mood and not correcting a mood, a mood information mode that corresponds to the message receiver is the not transmitting a mood. If a particular message receiver is set to be the not transmitting a mood and the correcting a mood, a mood information mode that corresponds to the message receiver is the correcting a mood. If a particular message receiver is set to be the transmitting a mood and not correcting a mood, a mood information mode that corresponds to the message receiver is the transmitting a mood. If a particular message receiver is set to be the transmitting a mood and the correcting a mood, mood information that corresponds to the message receiver is the correcting a mood.

For this embodiment of the present invention, a message receiver when the mood information mode that corresponds to the application program is the transmitting a mood and a message receiver when the mood information mode that corresponds to the application program is the correcting a mood are separately set, so that message receivers when a mood information mode is the not transmitting a mood, the transmitting a mood, and the correcting a mood are respectively set in a same application program according to subjective willingness of a message sender, and user experience can be further improved.

402. The terminal device acquires mood information of a message sender from voice information if the mood information mode that corresponds to the application program is correcting a mood.

The message sender sends a message to the message receiver by using the application program. In this embodiment of the present invention, the message sender may be a holder of a terminal device; the message receiver may be contacts that correspond to the application program; and the application program may be various chat application programs, call application programs, game application programs or the like. For example, when the application program is a chat application program, the message receiver may be chat friends in the chat application program. When the application program is a call application program, the message receiver may be contacts in the call application program. When the application program is a game application program, the message receiver may be game friends in the game application program.

For this embodiment of the present invention, the terminal device may perform intelligent analysis on a tone, a speaking speed or the like of the message sender in the voice information, to acquire mood information of the message sender in the voice operation instruction. For example, the mood information of the message sender in the voice operation instruction may be happiness, anxiety, impatience or the like.

403. The terminal device corrects the mood information of the message sender.

For this embodiment of the present invention, the terminal device may correct the mood information according to a preset rule. For example, the terminal device may correct negative mood information to positive mood information, or may correct a negative mood to a positive mood for a particular message receiver. In this embodiment of the present invention, after current mood information of the message sender is acquired, the mood information is corrected, which can prevent a negative mood from being output, so that user experience can be further improved.

404. The terminal device sends the corrected mood information of the message sender to a message receiver.

Optionally, step 404 may be: The terminal device sends an emoticon that corresponds to the corrected mood information of the message sender to the message receiver. In this embodiment of the present invention, the emoticon that corresponds to the mood information may be an emoticon corresponding to happiness, sadness, tears, surprise or the like.

Alternatively, step 404 may further be: The terminal device sends a special font that corresponds to the corrected mood information of the message sender to the message receiver. In this embodiment of the present invention, the terminal device presets a correspondence between mood information and a special font, so that after current mood information of the message sender is acquired, content that needs to be output by the message sender can be output according to a font corresponding to the mood information. For example, the terminal device may preset that a special font corresponding to happiness is a font such as SimYou, or may preset that a special font corresponding to sadness is SimHei or the like.

Alternatively, step 404 may further be: The terminal device sends a background picture that corresponds to the corrected mood information of the message sender to the message receiver. In this embodiment of the present invention, a correspondence between mood information and a background picture is preset, so that after current mood information of the message sender is acquired, content that needs to be output by the message sender can be output according to a background picture corresponding to the mood information. For example, the terminal device may preset that a background picture corresponding to happiness is a picture full of sunshine, or may preset that a background picture corresponding to sadness is a picture of a rainy day, or the like.

According to the mood information processing method and apparatus provided in this embodiment of the present invention, first a mood information mode that corresponds to an application program is determined, mood information of a message sender is acquired if the mood information mode that corresponds to the application program is transmitting a mood or correcting a mood, and then the mood information of the message sender is sent to a message receiver. Compared with sending a corresponding message directly according to message content entered by a message sender, in this embodiment of the present invention, current mood information of a message sender is intelligently acquired, and the current mood information of the message sender can be output, so that an intelligence degree of sending a message by a terminal device can be improved, and user experience can further be improved.

Figure 5:
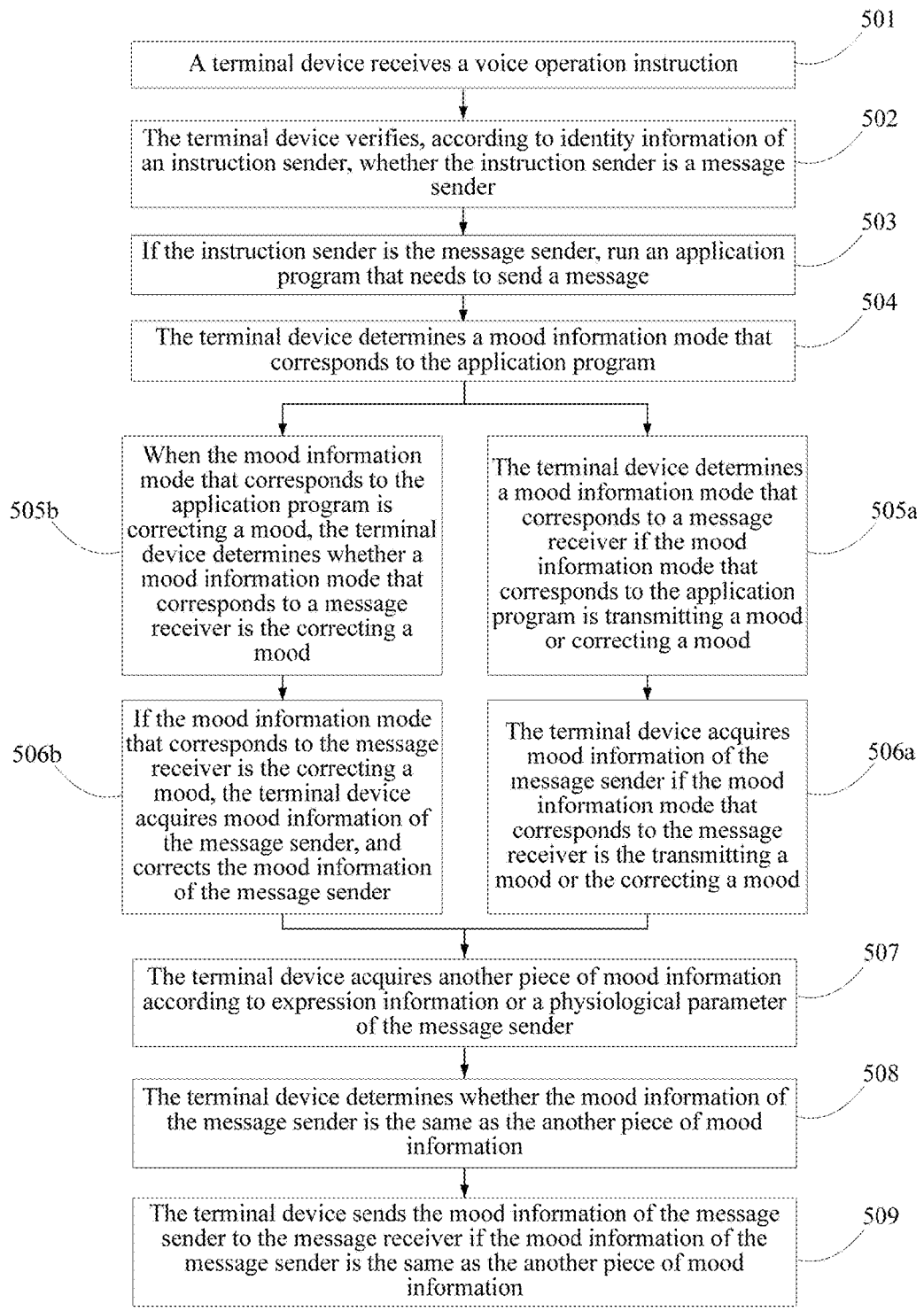
FIG. 5 is a flowchart of another mood information processing method according to an embodiment of the present invention.

An embodiment of the present invention provides another mood information processing method. As shown in FIG. 5, the method includes:

501. A terminal device receives a voice operation instruction.

The voice operation instruction carries an application program that needs to send information and a message receiver. For example, the voice operation instruction may be: send a message to tell my wife that I do not have to work overtime tonight, and I am driving home. In the voice operation instruction, the application program that needs to perform an operation is a message application program, the message receiver is the wife of the message sender, and output content is: I do not have to work overtime tonight, and I am driving home.

502. The terminal device verifies, according to identity information of an instruction sender, whether the instruction sender is a message sender.

The voice operation instruction carries the identity information of the instruction sender. In this embodiment of the present invention, the instruction sender is a sender corresponding to a voice operation instruction, and the message sender is a sender that can perform a corresponding operation by using the terminal device.

For this embodiment of the present invention, authentication is performed on a voice operation instruction, which can prevent a person except the message sender from incorrectly sending a voice operation instruction, so that user experience can be further improved.

503. If the instruction sender is the message sender, run an application program that needs to send a message.

For this embodiment of the present invention, a voice operation instruction is analyzed, so that an application program that needs to send a message can be determined. For example, the voice operation instruction may be: send a message to tell the professor to meet up at nine o'clock, where in the voice operation instruction, the application program that needs to send a message is a message application program; or the voice operation instruction may be: tell may WeChat friend Xiaoming that the place is the library, where in the voice operation instruction, the application program that needs to send a message is WeChat.

For this embodiment of the present invention, when an application program that needs to send a message is not specified in the voice operation instruction, the terminal device can determine, by means of analysis, multiple application programs that can implement the voice operation instruction. In this case, the terminal device runs an application program having the highest priority of the multiple application programs. Priorities of the multiple application programs of the terminal device may be configured by the message sender, or may be configured by the terminal device by analyzing a use habit of the message sender.

For example, the voice operation instruction is: tell my mom I will be home right away, where the application program that needs to send a message and that is carried in the voice operation instruction may be SMS, WeChat, Fetion, QQ, Microblog or the like. In this case, if an application program having the highest priority of these application programs is WeChat, the terminal device runs WeChat.

504. The terminal device determines a mood information mode that corresponds to the application program.

The mood information mode that corresponds to the application program includes not transmitting a mood, transmitting a mood, and correcting a mood.

For this embodiment of the present invention, when the mood information mode that corresponds to the application program is the not transmitting a mood, the terminal device does not allow the application program to acquire mood information of a message sender; when the mood information mode that corresponds to the application program is the transmitting a mood, the terminal device allows the application program to acquire mood information of a message sender; and when the mood information mode that corresponds to the application program is the correcting a mood, the terminal device allows the application program to acquire mood information of a message sender, and corrects the mood information of the message sender according to a rule. In this embodiment of the present invention, if a message sender does not set a corresponding mood information mode for a particular application program, by default a mood information mode that corresponds to the application program is the not transmitting a mood.

For this embodiment of the present invention, the mood information mode that corresponds to the application program may be: not transmitting a mood, transmitting a mood, correcting a mood, and transmitting a mood and correcting a mood.

Specifically, when the mood information mode that corresponds to the application program is the transmitting a mood, the message sender may arbitrarily set whether a mood information mode that respectively corresponds to each message receiver of the application program is the transmitting a mood, and if the message sender does not set the mood information mode, by default the mood information mode that corresponds to each message receiver of the application program is the transmitting a mood. When the mood information mode that corresponds to the application program is the correcting a mood, the message sender may arbitrarily set whether a mood information mode that respectively corresponds to each message receiver of the application program is the correcting a mood, and if the message sender does not set the mood information mode, by default the mood information mode that corresponds to each message receiver of the application program is the correcting a mood. When the mood information mode that corresponds to the application program is the transmitting a mood and the correcting a mood, the message sender may arbitrarily set whether a mood information mode that respectively corresponds to each message receiver of the application program is the transmitting a mood and the correcting a mood.

When the mood information mode that corresponds to the application program is the transmitting a mood and the correcting a mood, if a particular message receiver is set to be the not transmitting a mood and not correcting a mood, a mood information mode that corresponds to the message receiver is the not transmitting a mood. If a particular message receiver is set to be the not transmitting a mood and the correcting a mood, a mood information mode that corresponds to the message receiver is the correcting a mood. If a particular message receiver is set to be the transmitting a mood and not correcting a mood, a mood information mode that corresponds to the message receiver is the transmitting a mood. If a particular message receiver is set to be the transmitting a mood and the correcting a mood, mood information that corresponds to the message receiver is the correcting a mood.

For this embodiment of the present invention, a message receiver when the mood information mode that corresponds to the application program is the transmitting a mood and a message receiver when the mood information mode that corresponds to the application program is the correcting a mood are separately set, so that message receivers when a mood information mode is the not transmitting a mood, the transmitting a mood, and the correcting a mood are respectively set in a same application program according to subjective willingness of a message sender, and user experience can be further improved.

For this embodiment of the present invention, when the application program is a voice call, after step 504, the method may further include: if a mood information mode that corresponds to a voice call is correcting a mood, the terminal device may first acquire the mood information of the message sender from voice information, correct the mood information of the message sender, and then output the corrected mood information of the message sender.

Specifically, the terminal device may perform intelligent analysis on a tone, a speaking speed or the like of the message sender in the voice information, to acquire mood information of the message sender in the voice operation instruction. For example, the mood information of the message sender in the voice operation instruction may be happiness, anxiety, impatience or the like.

For this embodiment of the present invention, the terminal device may correct the mood information according to a preset rule. For example, the terminal device may correct negative mood information to positive mood information, or may correct a negative mood to a positive mood for a particular message receiver. In this embodiment of the present invention, after current mood information of the message sender is acquired, the mood information is corrected, which can prevent a negative mood from being output, so that user experience can be further improved.

505a. The terminal device determines a mood information mode that corresponds to a message receiver if the mood information mode that corresponds to the application program is transmitting a mood or correcting a mood.

The message sender sends a message to the message receiver by using the application program. In this embodiment of the present invention, the message sender may be a holder of a terminal device; the message receiver may be contacts that correspond to the application program; and the application program may be various chat application programs, call application programs, game application programs or the like. For example, when the application program is a chat application program, the message receiver may be chat friends in the chat application program. When the application program is a call application program, the message receiver may be contacts in the call application program. When the application program is a game application program, the message receiver may be game friends in the game application program.

For this embodiment of the present invention, the mood information mode that corresponds to the message receiver includes not transmitting a mood, transmitting a mood, and correcting a mood.

Specifically, when the mood information mode that corresponds to the message receiver is the not transmitting a mood, the terminal device does not allow the message receiver to acquire mood information of a message sender; when the mood information mode that corresponds to the message receiver is the transmitting a mood, the terminal device allows the message receiver to acquire mood information of a message sender; and when the mood information mode that corresponds to the message receiver is the correcting a mood, the terminal device allows the message receiver to acquire mood information of a message sender, and corrects the mood information of the message sender according to a rule. In this embodiment of the present invention, if a message sender does not set a corresponding mood information mode for a particular message receiver, by default a mood information mode that corresponds to the application program is the not transmitting a mood.

After step 505*a*, step 506*a*. The terminal device acquires mood information of the message sender if the mood information mode that corresponds to the message receiver is the transmitting a mood or the correcting a mood.

For this embodiment of the present invention, the terminal device may perform intelligent analysis on a tone, a speaking speed or the like of the message sender in the voice operation instruction, to acquire mood information of the message sender. For example, the mood information that is acquired according to the voice operation instruction may be happiness, anxiety, impatience or the like.

For this embodiment of the present invention, a message receiver when the mood information mode that corresponds to the application program is the transmitting a mood and a message receiver when the mood information mode that corresponds to the application program is the correcting a mood are separately set, so that message receivers when a mood information mode is the not transmitting a mood, the transmitting a mood, and the correcting a mood are respectively set in a same application program according to subjective willingness of a message sender, and user experience can be further improved.

Parallel to step 505*a*, step 505*b*. When the mood information mode that corresponds to the application program is correcting a mood, the terminal device determines whether a mood information mode that corresponds to a message receiver is the correcting a mood.

The mood information mode that corresponds to the message receiver includes not transmitting a mood, transmitting a mood, and correcting a mood.

For this embodiment of the present invention, when the mood information mode that corresponds to the message receiver is the not transmitting a mood, the terminal device does not allow the message receiver to acquire mood information of a message sender; when the mood information mode that corresponds to the message receiver is the transmitting a mood, the terminal device allows the message receiver to acquire mood information of a message sender; and when the mood information mode that corresponds to the message receiver is the correcting a mood, the terminal device allows the message receiver to acquire mood information of a message sender, and corrects the mood information of the message sender according to a rule. In this embodiment of the present invention, if a message sender does not set a corresponding mood information mode for a particular message receiver, by default a mood information mode that corresponds to the application program is the not transmitting a mood.

After step 505*b*, step 506*b*. If the mood information mode that corresponds to the message receiver is the correcting a mood, the terminal device acquires mood information of the message sender, and corrects the mood information of the message sender.

For this embodiment of the present invention, the terminal device may correct the mood information according to a preset rule. For example, the terminal device may correct negative mood information to positive mood information, or may correct a negative mood to a positive mood for a particular message receiver. In this embodiment of the present invention, after current mood information of the message sender is acquired, the mood information is corrected, which can prevent a negative mood from being output, so that user experience can be further improved.

507. The terminal device acquires another piece of mood information according to expression information or a physiological parameter of the message sender.

The other piece of mood information acquired by the terminal device may be any one or any combination of the following mood information: mood information that is acquired by using voice information, mood information that is acquired by using expression information, mood information that is acquired by using a physiological parameter, and the like.

Optionally, the terminal device may collect a recent call record or a recent voice chat record of a message sender, and perform intelligent analysis on a tone, a speaking speed or the like of the message sender in the call record or the voice chat record, to acquire another piece of mood information that corresponds to the message sender.

Alternatively, the terminal device may further collect recent photos of the message sender, and analyze facial expressions of the message sender in these photos, to acquire another piece of mood information that corresponds to the message sender. In this embodiment of the present invention, a photo collected by the terminal device may be a common self-portrait photo, a facial recognition and certification photo or the like.

Alternatively, the terminal device may further collect recent physiological parameters such as heartbeat and blood pressure of the message sender by using a smart device associated with the terminal device, to acquire another piece of mood information that corresponds to the message sender. In this embodiment of the present invention, the smart device associated with the terminal device may be a smart watch, a smart wristband or the like.

508. The terminal device determines whether the mood information of the message sender is the same as the other piece of mood information.

Optionally, after step 508, the method may further include: if the mood information of the message sender is different from the other piece of mood information, sending, by the terminal device, the other piece of mood information to the message receiver.

Alternatively, after step 508, the method may further include: if the mood information of the message sender is different from the other piece of mood information, quitting, by the terminal device, sending the other piece of mood information to the message receiver.

509. The terminal device sends the mood information of the message sender to the message receiver if the mood information of the message sender is the same as the other piece of mood information.

Optionally, step 509 may be: The terminal device sends an emoticon that corresponds to the mood information of the message sender to the message receiver if the mood information of the message sender is the same as the other piece of mood information. In this embodiment of the present invention, the emoticon that corresponds to the mood information may be an emoticon corresponding to happiness, sadness, tears, surprise or the like.

Alternatively, step 509 may further be: The terminal device sends a special font that corresponds to the mood information of the message sender to the message receiver if the mood information of the message sender is the same as the other piece of mood information. In this embodiment of the present invention, the terminal device presets a correspondence between mood information and a special font, so that after current mood information of the message sender is acquired, content that needs to be output by the message sender can be output according to a font corresponding to the mood information. For example, the terminal device may preset that a special font corresponding to happiness is a font such as SimYou, or may preset that a special font corresponding to sadness is SimHei or the like.

Alternatively, step 509 may further be: The terminal device sends a background picture that corresponds to the mood information of the message sender to the message receiver if the mood information of the message sender is the same as the other piece of mood information. In this embodiment of the present invention, a correspondence between mood information and a background picture is preset, so that after current mood information of the message sender is acquired, content that needs to be output by the message sender can be output according to a background picture corresponding to the mood information. For example, the terminal device may preset that a background picture corresponding to happiness is a picture full of sunshine, or may preset that a background picture corresponding to sadness is a picture of a rainy day, or the like.

According to the mood information processing method and apparatus provided in this embodiment of the present invention, first a mood information mode that corresponds to an application program is determined, mood information of a message sender is acquired if the mood information mode that corresponds to the application program is transmitting a mood or correcting a mood, and then the mood information of the message sender is sent to a message receiver. Compared with sending a corresponding message directly according to message content entered by a message sender, in this embodiment of the present invention, current mood information of a message sender is intelligently acquired, and the current mood information of the message sender can be output, so that an intelligence degree of sending a message by a terminal device can be improved, and user experience can further be improved.

Figure 6:
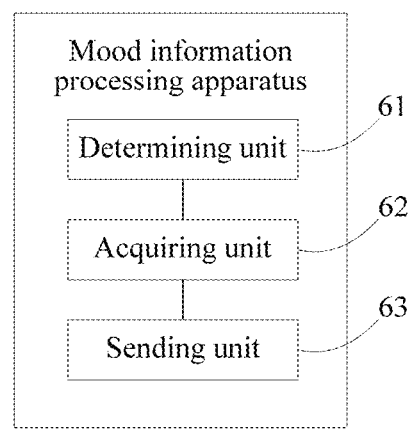
FIG. 6 is a schematic structural diagram of a mood information processing apparatus according to an embodiment of the present invention.

An embodiment of the present invention provides a mood information processing apparatus. As shown in FIG. 6, an entity of the apparatus may be a terminal device, for example, a PC (Personal Computer, personal computer), a mobile phone, or a tablet computer. The apparatus includes: a determining unit 61, an acquiring unit 62, and a sending unit 63.

The determining unit 61 is configured to determine a mood information mode that corresponds to an application program.

The mood information mode includes not transmitting a mood, transmitting a mood, and correcting a mood.

The acquiring unit 62 is configured to acquire mood information of a message sender when the determining unit 61 determines that the mood information mode that corresponds to the application program is the transmitting a mood or the correcting a mood, where the message sender sends a message to a message receiver by using the application program.

The sending unit 63 is configured to send the mood information of the message sender that is acquired by the acquiring unit 62 to the message receiver.

It should be noted that, for other corresponding descriptions that correspond to functional units in the mood information processing apparatus provided in this embodiment of the present invention, reference may be made to corresponding descriptions in FIG. 1, and details are not described herein again.

Figure 7:
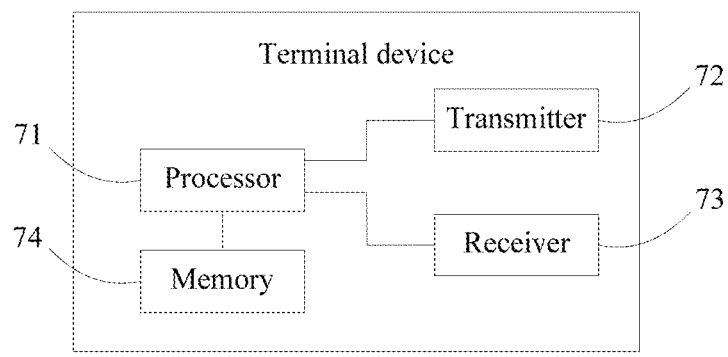
FIG. 7 is a schematic structural diagram of a terminal device according to an embodiment of the present invention.

Further, the entity of the mood information processing apparatus may be a terminal device, for example, a PC, a mobile, or a tablet computer. As shown in FIG. 7, the terminal device may include: a processor 71, a transmitter 72, a receiver 73, and a memory 74, where the receiver 73 and the memory 74 are separately connected to the processor 71.

The processor 71 is configured to determine a mood information mode that corresponds to an application program.

The mood information mode includes not transmitting a mood, transmitting a mood, and correcting a mood.

The acquiring unit 71 is further configured to acquire mood information of a message sender when the mood information mode that corresponds to the application program is the transmitting a mood or the correcting a mood, where the message sender sends a message to a message receiver by using the application program.

The transmitter 72 is configured to send the mood information of the message sender that is acquired by the processor 71 to the message receiver.

It should be noted that, for other corresponding descriptions that correspond to devices in the terminal device provided in this embodiment of the present invention, reference may be made to corresponding descriptions in FIG. 1, and details are not described herein again.

Figure 8:
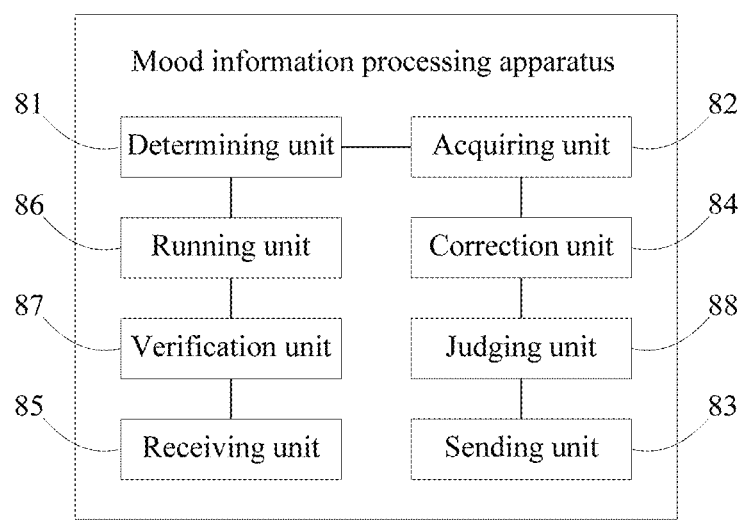
FIG. 8 is a schematic structural diagram of another mood information processing apparatus according to an embodiment of the present invention.

An embodiment of the present invention provides another mood information processing apparatus. As shown in FIG. 8, an entity of the apparatus may be a terminal device, for example, a PC, a mobile phone, or a tablet computer. The apparatus includes: a determining unit 81, an acquiring unit 82, and a sending unit 83.

The determining unit 81 is configured to determine a mood information mode that corresponds to an application program.

The mood information mode includes not transmitting a mood, transmitting a mood, and correcting a mood.

The acquiring unit 82 is configured to acquire mood information of a message sender when the determining unit 81 determines that the mood information mode that corresponds to the application program is the transmitting a mood or the correcting a mood, where the message sender sends a message to a message receiver by using the application program.

The sending unit 83 is configured to send the mood information of the message sender that is acquired by the acquiring unit 82 to the message receiver.

The determining unit 81 is further configured to determine a mood information mode that corresponds to the message receiver.

The acquiring unit 82 is specifically configured to acquire the mood information of the message sender when the determining unit 81 determines that the mood information mode that corresponds to the message receiver is the transmitting a mood or the correcting a mood.

The determining unit 82 is further configured to: when the mood information mode that corresponds to the application program is the correcting a mood, determine whether the mood information mode that corresponds to the message receiver is the correcting a mood.

Optionally, the apparatus may further include a correction unit 84.

The correction unit 84 is configured to correct the mood information of the message sender when the determining unit 81 determines that the mood information mode that corresponds to the message receiver is the correcting a mood.

The sending unit 83 is specifically configured to send the mood information of the message sender that is corrected by the correction unit 84 to the message receiver.

Optionally, the apparatus may further include a receiving unit 85 and a running unit 86.

The receiving unit 85 is configured to receive a voice operation instruction.

The voice operation instruction carries an application program that needs to send a message and the message receiver.

The running unit 86 is configured to run the application program that needs to send a message received by the receiving unit 85.

The acquiring unit 82 is specifically configured to acquire the mood information of the message sender according to the voice operation instruction when the determining unit 81 determines that the mood information mode that corresponds to the application program is the transmitting a mood or the correcting a mood.

The voice operation instruction received by the receiving unit 85 carries identity information of an instruction sender.

Optionally, the apparatus may further include a verification unit 87.

The verification unit 87 is configured to verify, according to the identity information of the instruction sender that is received by the receiving unit 85, whether the instruction sender is the message sender.

The running unit 86 is specifically configured to run the application program that needs to send a message when the verification unit 87 verifies that the instruction sender is the message sender.

The acquiring unit 82 is further configured to acquire another piece of mood information according to expression information or a physiological parameter of the message sender.

Optionally, the apparatus may further include a judging unit 88.

The judging unit 88 is configured to determine whether the mood information of the message sender is the same as the other piece of mood information that is acquired by the acquiring unit 82.

The sending unit 83 is specifically configured to send the mood information of the message sender to the message receiver when the judging unit 88 determines that the mood information of the message sender is the same as the other piece of mood information.

The acquiring unit 82 is specifically configured to acquire the mood information of the message sender from voice information when the determining unit 81 determines that the mood information mode that corresponds to the application program is the correcting a mood.

The correction unit 84 is further configured to correct the mood information of the message sender that is acquired by the acquiring unit 82.

The sending unit 83 is specifically configured to send the mood information of the message sender that is corrected by the correction unit 84 to the message receiver.

The sending unit 83 is specifically configured to send an emoticon that corresponds to the mood information of the message sender to the message receiver.

The sending unit 83 is specifically further configured to send a special font that corresponds to the mood information of the message sender to the message receiver.

The sending unit 83 is specifically further configured to send a background picture that corresponds to the mood information of the message sender to the message receiver.

It should be noted that, for other corresponding descriptions that correspond to functional units in the mood information processing apparatus provided in this embodiment of the present invention, reference may be made to corresponding descriptions in FIG. 5, and details are not described herein again.

Figure 9:
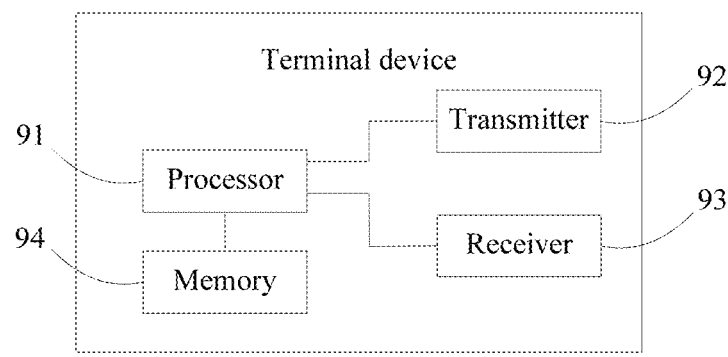
FIG. 9 is a schematic structural diagram of another terminal device according to an embodiment of the present invention.

Further, the entity of the mood information processing apparatus may be a terminal device, for example, a PC, a mobile phone, or a tablet computer. As shown in FIG. 9, the terminal device may include: a processor 91, a transmitter 92, a receiver 93, and a memory 94, where the receiver 93 and the memory 94 are separately connected to the processor 91.

The processor 91 is configured to determine a mood information mode that corresponds to an application program.

The mood information mode includes not transmitting a mood, transmitting a mood, and correcting a mood.

The acquiring unit 91 is further configured to acquire mood information of a message sender when the mood information mode that corresponds to the application program is the transmitting a mood or the correcting a mood, where the message sender sends a message to a message receiver by using the application program.

The transmitter 92 is configured to send the mood information of the message sender that is acquired by the processor 91 to the message receiver.

The processor 91 is further configured to determine a mood information mode that corresponds to the message receiver.

The processor 91 is specifically configured to acquire the mood information of the message sender when the mood information mode that corresponds to the message receiver is the transmitting a mood or the correcting a mood.

The processor 91 is further configured to: when the mood information mode that corresponds to the application program is the correcting a mood, determine whether the mood information mode that corresponds to the message receiver is the correcting a mood.

The processor 91 is further configured to correct the mood information of the message sender when the mood information mode that corresponds to the message receiver is the correcting a mood.

The transmitter 92 is specifically configured to send the mood information of the message sender that is corrected by the processor 91 to the message receiver.

The receiver 93 is configured to receive a voice operation instruction.

The voice operation instruction carries an application program that needs to send a message and the message receiver.

The processor 91 is further configured to run the application program that needs to send a message.

The processor 91 is specifically configured to acquire the mood information of the message sender according to the voice operation instruction when the mood information mode that corresponds to the application program is the transmitting a mood or the correcting a mood.

The voice operation instruction received by the receiver 93 carries identity information of an instruction sender.

The processor 91 is further configured to verify, according to the identity information of the instruction sender, whether the instruction sender is the message sender.

The processor 91 is specifically configured to run the application program that needs to send a message when the instruction sender is the message sender.

The processor 91 is further configured to acquire another piece of mood information according to expression information or a physiological parameter of the message sender.

The processor 91 is further configured to determine whether the mood information of the message sender is the same as the other piece of mood information.

The transmitter 92 is specifically configured to send the mood information of the message sender to the message receiver when the mood information of the message sender is the same as the other piece of mood information.

The processor 91 is specifically configured to acquire the mood information of the message sender from voice information when the mood information mode that corresponds to the application program is the correcting a mood.

The processor 91 is further configured to correct the mood information of the message sender.

The transmitter 92 is specifically configured to send the mood information of the message sender that is corrected by the processor 91 to the message receiver.

The transmitter 92 is specifically configured to send an emoticon that corresponds to the mood information of the message sender to the message receiver.

The transmitter 92 is specifically further configured to send a special font that corresponds to the mood information of the message sender to the message receiver.

The transmitter 92 is specifically further configured to send a background picture that corresponds to the mood information of the message sender to the message receiver.

It should be noted that, for other corresponding descriptions that correspond to devices in the terminal device provided in this embodiment of the present invention, reference may be made to corresponding descriptions in FIG. 5, and details are not described herein again.

The mood information processing apparatus provided in this embodiment of the present invention can implement the method embodiments provided above. For specific functional implementations, refer to descriptions in the method embodiments, and details are not described herein again. The mood information processing method and apparatus provided in the embodiments of the present invention are applicable to, but not limited to, outputting mood information of a user in an application program.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A mood information processing method, comprising:
   determining a mood information mode that corresponds to an application program, wherein the mood information mode comprises:
   not transmitting a mood,
   transmitting a mood, and
   correcting a mood;
   acquiring mood information of a message sender if the mood information mode that corresponds to the application program is the transmitting a mood or the correcting a mood, wherein the message sender sends a message to a message receiver by using the application program;
   sending the mood information of the message sender to the message receiver;
   wherein before acquiring mood information of a message sender, the method further comprises:
   determining a mood information mode that corresponds to the message receiver; and
   acquiring mood information of a message sender comprises:
   acquiring the mood information of the message sender if the mood information mode that corresponds to the message receiver is the transmitting a mood or the correcting a mood.

2. A mood information processing method, comprising:
   determining a mood information mode that corresponds to an application program, wherein the mood information mode comprises:
   not transmitting a mood,
   transmitting a mood, and
   correcting a mood;
   acquiring mood information of a message sender if the mood information mode that corresponds to the application program is the transmitting a mood or the correcting a mood, wherein the message sender sends a message to a message receiver by using the application program;
   sending the mood information of the message sender to the message receiver;
   wherein before acquiring mood information of a message sender, the method further comprises:
   when the mood information mode that corresponds to the application program is the correcting a mood, determining whether a mood information mode that corresponds to the message receiver is the correcting a mood, and
   correcting the mood information of the message sender if the mood information mode that corresponds to the message receiver is the correcting a mood; and
   sending the mood information of the message sender to the message receiver comprises:
   sending the corrected mood information of the message sender to the message receiver.

3. A mood information processing method, comprising:
   determining a mood information mode that corresponds to an application program, wherein the mood information mode comprises:
   not transmitting a mood,
   transmitting a mood, and
   correcting a mood;
   acquiring mood information of a message sender if the mood information mode that corresponds to the application program is the transmitting a mood or the correcting a mood, wherein the message sender sends a message to a message receiver by using the application program;
   sending the mood information of the message sender to the message receiver;
   wherein before determining a mood information mode that corresponds to an application program, the method further comprises:

receiving a voice operation instruction, wherein the voice operation instruction carries an application program that needs to send a message and the message receiver, and running the application program that needs to send a message; and acquiring mood information of a message sender if the mood information mode that corresponds to the application program is the transmitting a mood or the correcting a mood comprises:

acquiring the mood information of the message sender according to the voice operation instruction if the mood information mode that corresponds to the application program is the transmitting a mood or the correcting a mood.

4. The mood information processing method according to claim 3, wherein:

the voice operation instruction carries identity information of an instruction sender;

before running the application program that needs to send a message, the method further comprises:

verifying, according to the identity information of the instruction sender, whether the instruction sender is the message sender; and running the application program that needs to send a message comprises:

if the instruction sender is the message sender, running the application program that needs to send a message.

5. The mood information processing method according to claim 3, wherein:

after acquiring the mood information of the message sender according to the voice operation instruction, the method further comprises:

acquiring another piece of mood information according to expression information or a physiological parameter of the message sender, and determining whether the mood information of the message sender is the same as the other piece of mood information; and sending the mood information of the message sender to the message receiver comprises:

sending the mood information of the message sender to the message receiver if the mood information of the message sender is the same as the other piece of mood information.

6. A mood information processing method, comprising:

determining a mood information mode that corresponds to an application program, wherein the mood information mode comprises:

not transmitting a mood, transmitting a mood, and correcting a mood;

acquiring mood information of a message sender if the mood information mode that corresponds to the application program is the transmitting a mood or the correcting a mood, wherein the message sender sends a message to a message receiver by using the application program;

sending the mood information of the message sender to the message receiver;

wherein when the application program is a voice call, acquiring mood information of a message sender if the mood information mode that corresponds to the application program is the transmitting a mood or the correcting a mood comprises:

acquiring the mood information of the message sender from voice information if the mood information mode that corresponds to the application program is the correcting a mood;

after acquiring the mood information of the message sender from voice information, the method further comprises:

correcting the mood information of the message sender; and sending the mood information of the message sender to the message receiver comprises:

sending the corrected mood information of the message sender to the message receiver.

7. The mood information processing method according to claim 1, wherein sending the mood information of the message sender to the message receiver comprises:

sending an emoticon that corresponds to the mood information of the message sender to the message receiver; or sending a special font that corresponds to the mood information of the message sender to the message receiver; or sending a background picture that corresponds to the mood information of the message sender to the message receiver.

8. A mood information processing apparatus, comprising:

a processor;

memory coupled to the processor, the memory comprising instructions that, when executed by the processor, cause the apparatus to:

determine a mood information mode that corresponds to an application program, wherein the mood information mode comprises:

not transmitting a mood, transmitting a mood, and correcting a mood;

acquire mood information of a message sender when it is determined that the mood information mode that corresponds to the application program is the transmitting a mood or the correcting a mood, wherein the message sender sends a message to a message receiver by using the application program;

send the mood information of the message sender that is acquired to the message receiver;

wherein the memory further comprises instructions that, when executed by the processor, cause the apparatus to:

determine a mood information mode that corresponds to the message receiver; and acquire the mood information of the message sender when it is determined that the mood information mode that corresponds to the message receiver is the transmitting a mood or the correcting a mood.

9. A mood information processing apparatus, comprising:

a processor;

memory coupled to the processor, the memory comprising instructions that, when executed by the processor, cause the apparatus to:

determine a mood information mode that corresponds to an application program, wherein the mood information mode comprises:

not transmitting a mood, transmitting a mood, and correcting a mood;

acquire mood information of a message sender when it is determined that the mood information mode that corresponds to the application program is the transmitting a mood or the correcting a mood, wherein the message sender sends a message to a message
receiver by using the application program;
send the mood information of the message sender that
is acquired to the message receiver;
wherein the memory further comprises instructions that,
when executed by the processor, cause the apparatus to:
when the mood information mode that corresponds to
the application program is the correcting a mood,
determine whether a mood information mode that
corresponds to the message receiver is the correcting
a mood;
correct the mood information of the message sender
when it is determined that the mood information
mode that corresponds to the message receiver is the
correcting a mood; and
send the mood information of the message sender that is
corrected to the message receiver.

10. A mood information processing apparatus, comprising:
a processor;
memory coupled to the processor, the memory comprising
instructions that, when executed by the processor,
cause the apparatus to:
determine a mood information mode that corresponds
to an application program, wherein the mood information mode comprises:
not transmitting a mood,
transmitting a mood, and
correcting a mood;
acquire mood information of a message sender when it
is determined that the mood information mode that
corresponds to the application program is the transmitting a mood or the correcting a mood, wherein the
message sender sends a message to a message
receiver by using the application program;
send the mood information of the message sender to the
message receiver;
receive a voice operation instruction, wherein the voice
operation instruction carries an application program
that needs to send a message and the message
receiver;
run the application program that needs to send the
received message; and
acquire the mood information of the message sender
according to the voice operation instruction when it
is determined that the mood information mode that
corresponds to the application program is the transmitting a mood or the correcting a mood.

11. The mood information processing apparatus according to claim 10, wherein:
the received voice operation instruction carries identity
information of an instruction sender;
the memory further comprises instructions that, when
executed by the processor, cause the apparatus to:
verify, according to the received identity information of
the instruction sender, whether the instruction sender
is the message sender; and
run the application program that needs to send a
message when it is verified that the instruction
sender is the message sender.

12. The mood information processing apparatus according to claim 10, wherein the memory further comprises instructions that, when executed by the processor, cause the apparatus to:
acquire another piece of mood information according to
expression information or a physiological parameter of
the message sender;
determine whether the mood information of the message
sender is the same as the other piece of mood information that is acquired; and
send the mood information of the message sender to the
message receiver when it is determined that the mood
information of the message sender is the same as the
other piece of mood information.

13. A mood information processing apparatus, comprising:
a processor;
memory coupled to the processor, the memory comprising
instructions that, when executed by the processor,
cause the apparatus to:
determine a mood information mode that corresponds
to an application program, wherein the mood information mode comprises:
not transmitting a mood,
transmitting a mood, and
correcting a mood;
acquire mood information of a message sender when it
is determined that the mood information mode that
corresponds to the application program is the transmitting a mood or the correcting a mood, wherein the
message sender sends a message to a message
receiver by using the application program;
send the mood information of the message sender that is
acquired to the message receiver;
wherein the memory further comprises instructions that,
when executed by the processor, cause the apparatus to:
when the application program is a voice call, acquire
the mood information of the message sender from
voice information when the it is determined that the
mood information mode that corresponds to the
application program is the correcting a mood;
correct the mood information of the message sender
that is acquired; and
send the mood information of the message sender that
is corrected to the message receiver.

14. The mood information processing apparatus according to claim 8, wherein the memory further comprises instructions that, when executed by the processor, cause the apparatus to:
send an emoticon that corresponds to the mood information of the message sender to the message receiver;
send a special font that corresponds to the mood information of the message sender to the message receiver;
and
send a background picture that corresponds to the mood
information of the message sender to the message
receiver.

15. A terminal device, comprising:
a processor, configured to:
determine a mood information mode that corresponds
to an application program, wherein the mood information mode comprises:
not transmitting a mood,
transmitting a mood, and
correcting a mood; and
acquire mood information of a message sender when
the mood information mode that corresponds to the
application program is the transmitting a mood or the
correcting a mood,
and the message sender sends a message to a message receiver by using the application program;
a transmitter, configured to send the mood information of
the message sender that is acquired by the processor to
the message receiver;

wherein the processor is further configured to:
determine a mood information mode that corresponds to the message receiver; and
acquire the mood information of the message sender when the mood information mode that corresponds to the message receiver is the transmitting a mood or the correcting a mood.

16. A terminal device, comprising:
a processor, configured to:
determine a mood information mode that corresponds to an application program, wherein the mood information mode comprises:
not transmitting a mood,
transmitting a mood, and
correcting a mood; and
acquire mood information of a message sender when the mood information mode that corresponds to the application program is the transmitting a mood or the correcting a mood, and the message sender sends a message to a message receiver by using the application program;
a transmitter, configured to send the mood information of the message sender that is acquired by the processor to the message receiver;
wherein the processor is further configured to:
when the mood information mode that corresponds to the application program is the correcting a mood, determine whether a mood information mode that corresponds to the message receiver is the correcting a mood, and
correct the mood information of the message sender when the mood information mode that corresponds to the message receiver is the correcting a mood; and
the transmitter is configured to send the mood information of the message sender that is corrected by the processor to the message receiver.

17. A terminal device, comprising:
a processor, configured to:
determine a mood information mode that corresponds to an application program, wherein the mood information mode comprises:
not transmitting a mood,
transmitting a mood, and
correcting a mood; and
acquire mood information of a message sender when the mood information mode that corresponds to the application program is the transmitting a mood or the correcting a mood, and the message sender sends a message to a message receiver by using the application program;
a transmitter, configured to send the mood information of the message sender that is acquired by the processor to the message receiver;
wherein the terminal device further comprises a receiver configured to receive a voice operation instruction, wherein the voice operation instruction carries an application program that needs to send a message and the message receiver; and
the processor is further configured to:
run the application program that needs to send a message received by the receiver, and
acquire the mood information of the message sender according to the voice operation instruction when the mood information mode that corresponds to the application program is the transmitting a mood or the correcting a mood.

18. The terminal device according to claim 17, wherein:
the voice operation instruction received by the receiver carries identity information of an instruction sender; and
the processor is further configured to:
verify, according to the identity information of the instruction sender that is received by the receiver, whether the instruction sender is the message sender, and
run the application program that needs to send a message when the instruction sender is the message sender.

19. The terminal device according to claim 17, wherein:
the processor is further configured to:
acquire another piece of mood information according to expression information or a physiological parameter of the message sender, and
determine whether the mood information of the message sender is the same as the other piece of mood information; and
the transmitter is configured to send the mood information of the message sender to the message receiver when the processor determines that the mood information of the message sender is the same as the other piece of mood information.

20. A terminal device, comprising:
a processor, configured to:
determine a mood information mode that corresponds to an application program, wherein the mood information mode comprises:
not transmitting a mood,
transmitting a mood, and
correcting a mood; and
acquire mood information of a message sender when the mood information mode that corresponds to the application program is the transmitting a mood or the correcting a mood, and the message sender sends a message to a message receiver by using the application program;
a transmitter, configured to send the mood information of the message sender that is acquired by the processor to the message receiver;
wherein when the application program is a voice call, the processor is configured to acquire the mood information of the message sender from voice information when the mood information mode that corresponds to the application program is the correcting a mood;
the processor is further configured to correct the mood information of the message sender; and
the transmitter is configured to send the mood information of the message sender that is corrected by the processor to the message receiver.

21. The terminal device according to claim 15, wherein the transmitter is configured to:
send an emoticon that corresponds to the mood information of the message sender to the message receiver;
send a special font that corresponds to the mood information of the message sender to the message receiver; and
send a background picture that corresponds to the mood information of the message sender to the message receiver.

* * * * *